Figure 1:
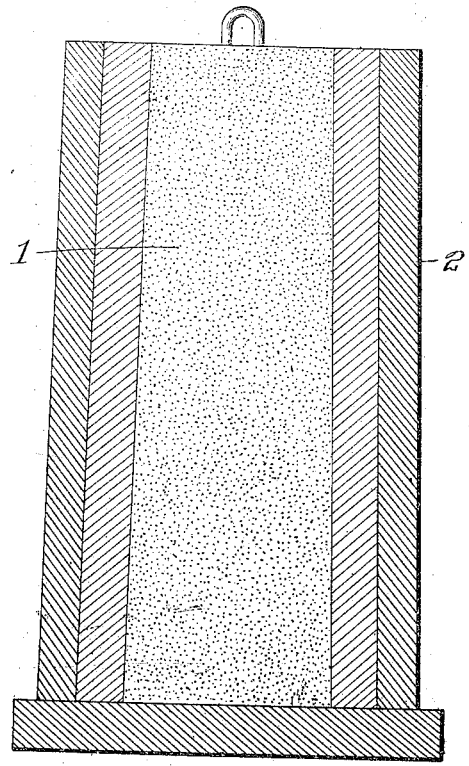

No. 638,961. Patented Dec. 12, 1899.
S. A. COSGRAVE.
ART OF MAKING COMPOUND INGOTS.
(Application filed Apr. 29, 1899.)

(No Model.) 2 Sheets—Sheet 1.

WITNESSES:
Herbert Bradley.
E. Newell.

INVENTOR,
Sylvester A. Cosgrave
by Dannin S. Wolcott
Att'y.

No. 638,961. Patented Dec. 12, 1899.
S. A. COSGRAVE.
ART OF MAKING COMPOUND INGOTS.
(Application filed Apr. 29, 1899.)

(No Model.) 2 Sheets—Sheet 2.

WITNESSES:
Herbert Bradley.
E. Newell.

INVENTOR,
Sylvester A. Cosgrave
by Darwin S. Wolcott
Att'y.

UNITED STATES PATENT OFFICE.

SYLVESTER A. COSGRAVE, OF EDGEWOOD PARK, PENNSYLVANIA, ASSIGNOR TO MARIA B. COSGRAVE, OF SAME PLACE, AND AARON FRENCH AND MARGARET L. PATTERSON, OF PITTSBURG, PENNSYLVANIA.

ART OF MAKING COMPOUND INGOTS.

SPECIFICATION forming part of Letters Patent No. 638,961, dated December 12, 1899.

Application filed April 29, 1899. Serial No. 714,952. (No specimens.)

*To all whom it may concern:*

Be it known that I, SYLVESTER A. COSGRAVE, a citizen of the United States, residing at Edgewood Park, in the county of Allegheny and State of Pennsylvania, have invented or discovered certain new and useful Improvements in the Manufacture of Compound Ingots, of which improvements the following is a specification.

The invention described herein relates to certain improvements in the manufacture of compound ingots or billets—i. e., those consisting of two grades or kinds of metal, as hard and soft steel. The method now in general use consists in dividing the ingot or billet mold by a thin sheet-metal partition and pouring the two kinds or grades of metal on opposite sides of the partition. By contact with the hot metal the partition is either melted and so becomes incorporated with the molten metals and permits the two bodies of metal to come together and unite or the partition becomes heated to a welding heat and the two bodies of metal unite with the surfaces of the partition. This method will produce a close union between the two bodies of metal, but not a welding or intimate knitting of the two metals. This failure to weld is believed to be due to a change in the metals in contact with the cold or comparatively cold partition, and, further, two metals have been united by applying a flux to the heated surface of one metal or by heating such metal to a high temperature after the application of the flux and then pouring the other metal on the prepared surface. In these methods the flux does not penetrate below the surface of the first metal, but simply acts to remove the surface oxid, which would prevent the adherence of the two metals. It is characteristic of the metals above described that the two metals simply adhere together and that neither of them in any way affects the chemical or physical characteristics of the other, but that each, even at the plane of adherence, has the same chemical and physical characteristics as at points distant from the plane of adherence. It has also been attempted to produce compound ingots by casting one of the metals in a suitable mold, then immediately exposing or uncovering one surface thereof, and casting the other metal thereon. Although the metal first cast may appear to be still molten, there will be formed thereon a thin skin which will prevent the complete welding of the two metals. While either of these methods will produce an adhesion of the two metals which will be sufficient where the articles are not subjected to excessive strains, they will not produce such a welding or amalgamation of the two metals as is necessary to preclude the possibility of one metal being removed from the other under violent shocks.

The object of the present invention is to prevent the elemental change produced in the portions of the bodies of metal in contact with the partition, whereby a weld or amalgamation of the adjacent portions of the two bodies is prevented in the practice of the old methods, or in case such elemental change is produced to provide for the elimination of the changed portions.

It is a further object of the invention to bring the two metals together under such conditions that the chemical and physical characteristics of both metals at and adjacent to the plane of mixture or union will be changed, the characteristics of one metal being modified or changed by the other. The invention is hereinafter more fully described and claimed.

Figure 3:
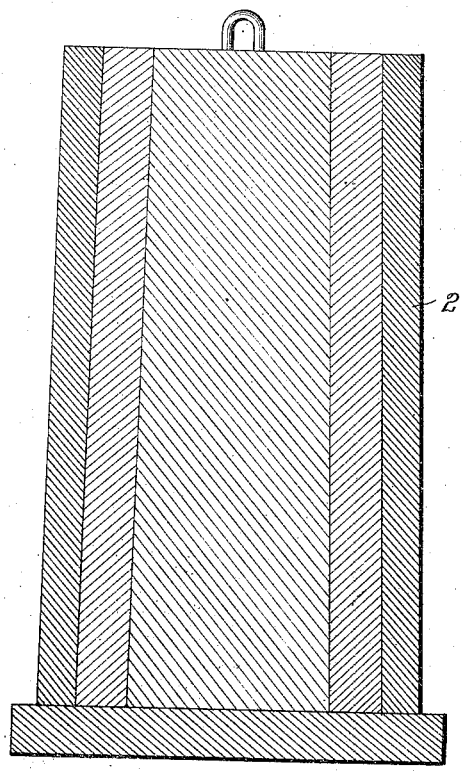
Figure 2:
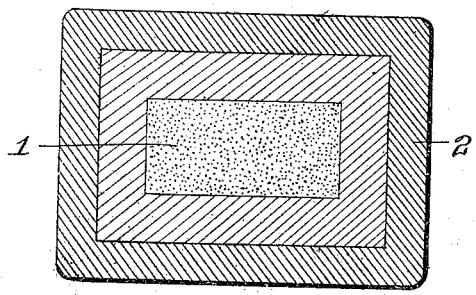
Figure 4:
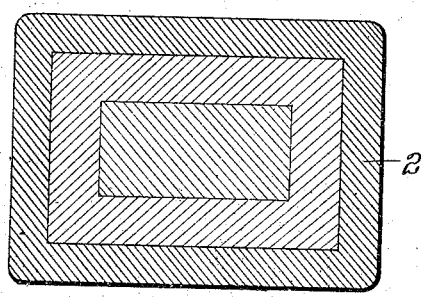
Figure 5:
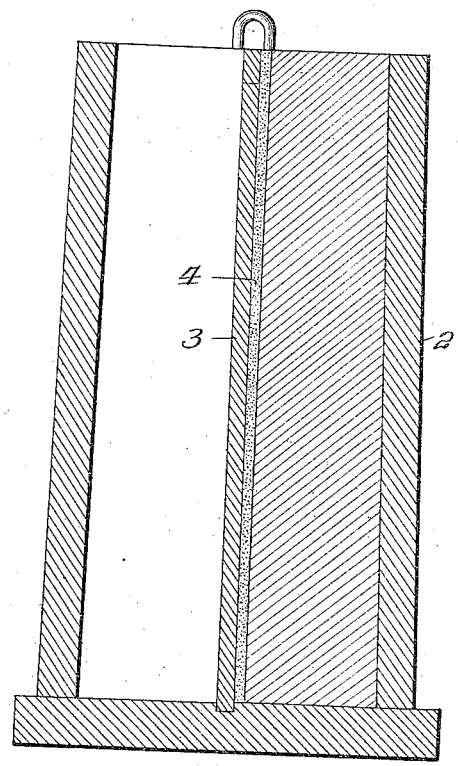
Figure 7:
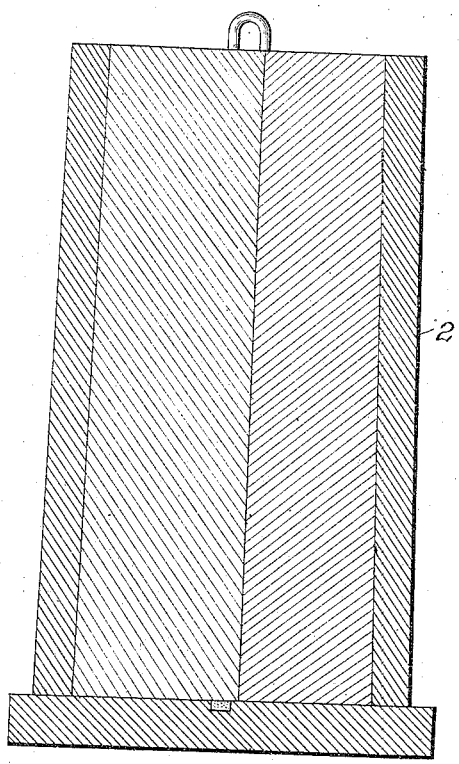
Figure 6:
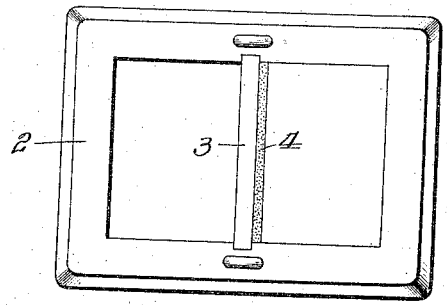

In the accompanying drawings, forming a part of this specification, Figure 1 is a sectional elevation of an ingot-mold having a hollow ingot cast therein and showing the core in position. Fig. 2 is a sectional plan view of the same. Fig. 3 is a view similar to Fig. 1, the core being removed and the hollow ingot filled with metal. Fig. 4 is a sectional plan view of the same. Fig. 5 is a sectional elevation of an ingot-mold having a transverse partition coated on one face with a fluxing material, one chamber of the mold being filled with metal. Fig. 6 is a sectional plan view of the same. Fig. 7 is a view similar to Fig. 5, the partition being removed and the other portion of the mold filled with metal.

In the practice of my invention one of the metals to be united is cast in a suitable mold and the surface to which the other metal is to be united is thoroughly fluxed by the application thereto of silica or any other suitable fluxing material. This fluxing should be effected in such manner and under such conditions of heat—i. e., while the metal adjacent to the portion to be fluxed is in a molten condition—that the fluxing action will penetrate to a suitable depth, so as to insure the incorporation of the two metals one with the other. It is preferred that an amount of flux in excess of that required to cleanse and prepare the surface of metal first cast should be applied thereto, so that the portion of the second metal in contact with the fluxed surface may also be cleansed and liquefied, so as to promote or facilitate the amalgamation or union of the two metals. The fluxing or preparation of the metal is effected at the time of casting of the first body of the mold. This can be done by forming that portion of the mold serving as the matrix of the surface to which the other metal is to be united of a fluxing material, as sand, or coating such matrix portion with a fluxing material. When the molten metal is poured into such a mold, the metal in contact with the fluxing material will be so acted on by the material that if the other metal be poured on such prepared surface while the latter is at a welding temperature the two metals will become thoroughly intermingled or amalgamated. This method is especially effective in uniting two grades of steel, as this metal when sufficiently molten to cast will penetrate a considerable depth into the walls of the mold, so that the fluxing material becomes embedded in the steel and will therefore affect the latter to a greater depth than is practically possible when the fluxing material is applied to the surface after the metal has been cast. By this method—i. e., the incorporation of the fluxing material in the metal—a perfect welding of two bodies of metal can be effected, even if the body first cast be allowed to cool below a welding temperature, provided it be raised to or approximately to a welding temperature before the second body of metal is cast thereon. The possibility of forming a perfect weld under such conditions is due to the fact that the fluxing material forms a protective coating over the surface, tending to prevent any material oxidation, or if oxidation should occur the presence of the flux will effect a removal or separation of the oxid when the body of metal is heated as described, and also to the fact that flux penetrating, as it does, under such conditions renders the two metals so fluid and free from oxid for a considerable depth that the two metals will be thoroughly intermingled and the chemical and physical characteristics of each will be greatly modified, and, further, this method insures the presence of an amount of flux in excess of that required to flux the surface of the first body of metal. This excess will, as before stated, have a beneficial effect in promoting welding on the second metal. The character of the weld or connection thus formed is evidenced by the fact that if the two metals are different in kind or quality, as high and low carbon steel, the metal adjacent to the plane of weld will differ—as, for example, in carbon content—from both the metals united, thus showing an amalgamation of the metals at the plane of weld, whereas there is a sharp line of demarcation when two bodies of metal are united under the old practice.

A convenient means for the practice of the invention is shown in Figs. 1 to 4, inclusive, and consists of placing a core 1 in the mold 2, pouring one of the metals into the mold, removing the core, and then filling the chamber thus formed with the other metal. The core is formed of or coated with a suitable fluxing material. Another method of practicing the invention consists in dividing the mold 2ᵃ into two or more compartments by one or more transverse partitions 3, formed of or having one of its faces coated with a suitable fluxing material, as shown at 4. One of the metals is then cast into the compartment having the surface of one of its walls formed of fluxing material, the partition removed, and the remaining space filled with the other metal.

I claim herein as my invention—

As an improvement in the art of manufacturing compound ingots, the method herein described which consists in casting one of the metals against a mold-wall consisting in part at least of a fluxing material, then removing the mold-wall and casting the other metal on the fluxed surface when the latter is at a welding temperature, substantially as set forth.

In testimony whereof I have hereunto set my hand.

SYLVESTER A. COSGRAVE

Witnesses:
DARWIN S. WOLCOTT.
G. I. HOLDSHIP.